Nov. 18, 1930.                B. W. PAPE                1,781,857
APPARATUS FOR SCREENING, SORTING, AND HANDLING MATERIAL
Original Filed March 21, 1925    2 Sheets-Sheet 1
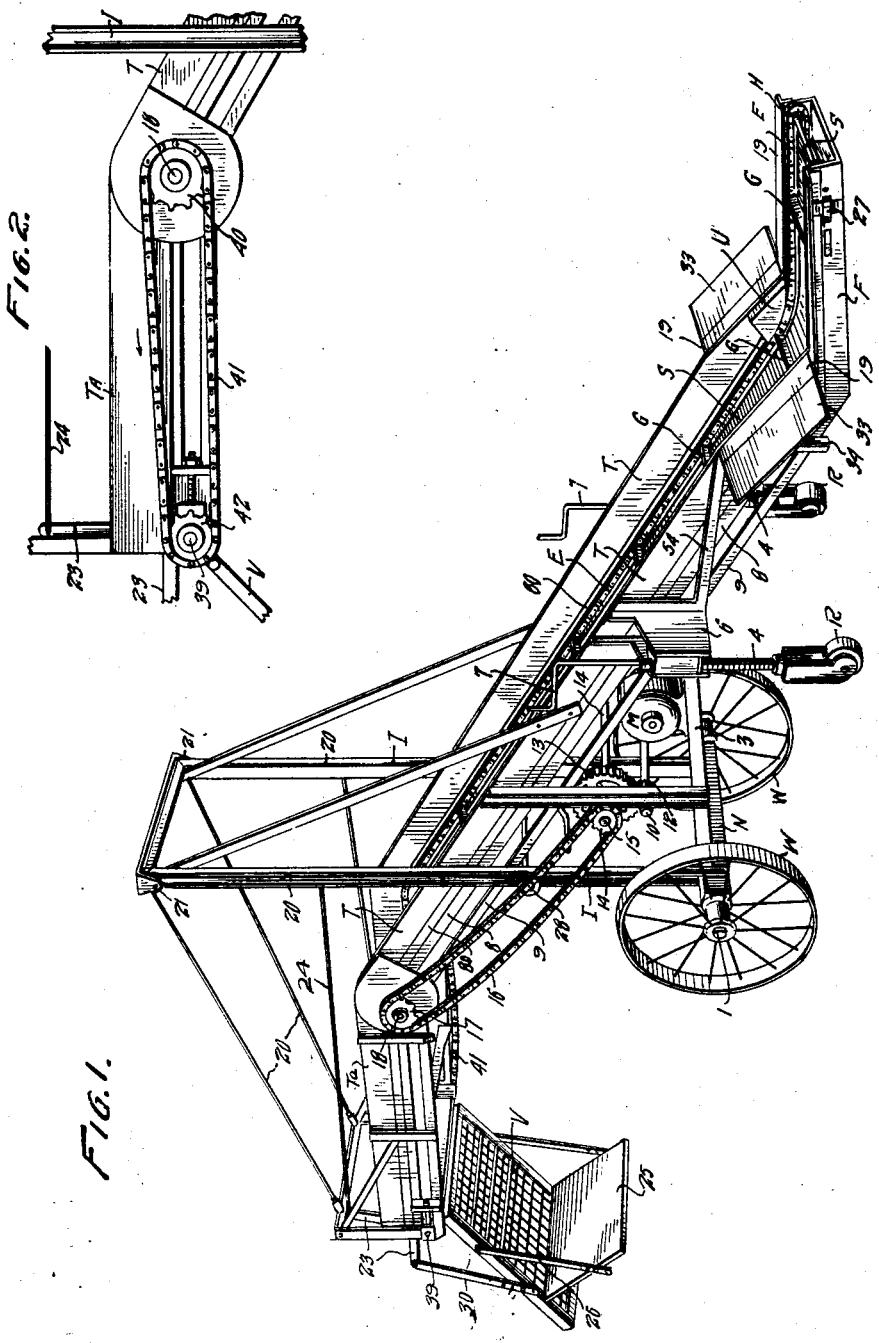
Inventor
BYRON W. PAPE

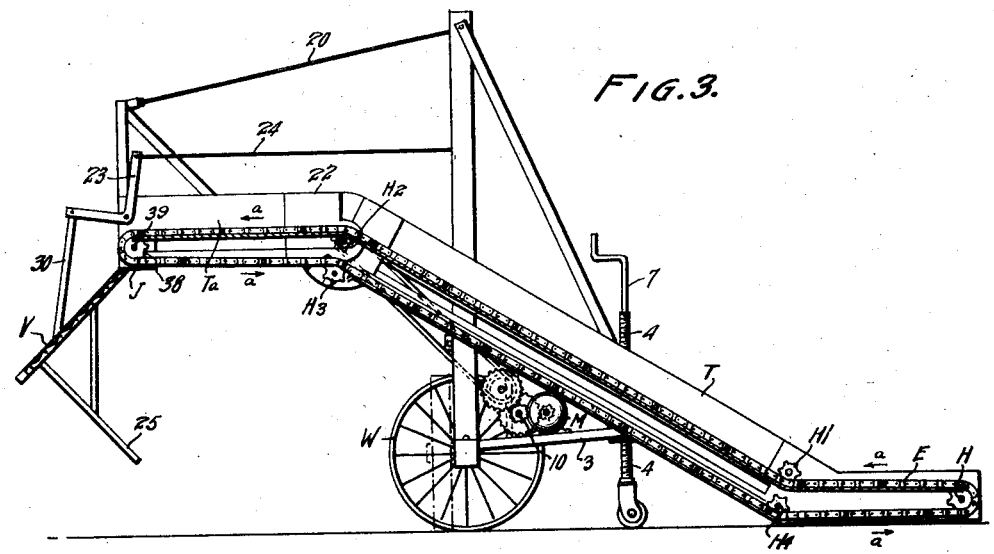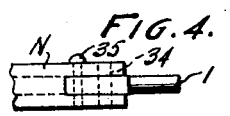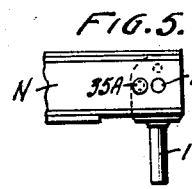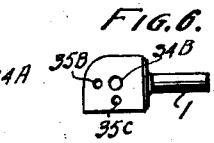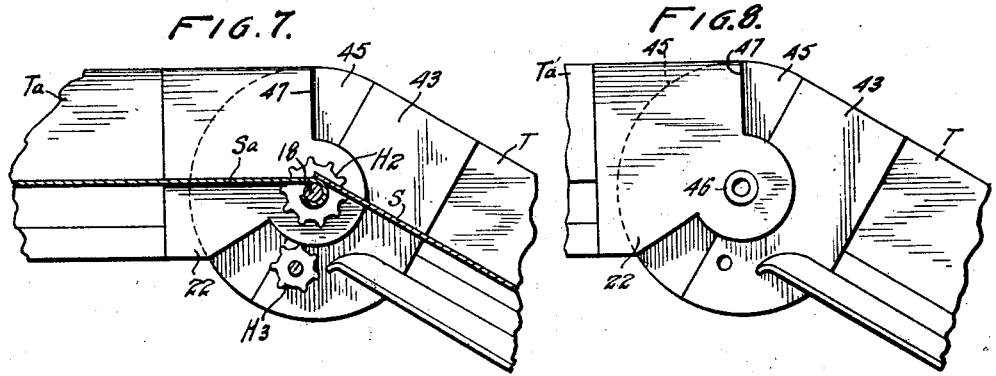

Patented Nov. 18, 1930

1,781,857

UNITED STATES PATENT OFFICE

BYRON W. PAPE, OF SALT LAKE CITY, UTAH

APPARATUS FOR SCREENING, SORTING, AND HANDLING MATERIAL

Original application filed March 21, 1925, Serial No. 17,224. Divided and this application filed May 12, 1926. Serial No. 108,623.

My invention relates to handling coal in retail coal yards or distributing depots, and has for its object to provide an economical process for handling, screening and transferring coal from a coal transporting dump car into storage piles and for handling, screening and loading from a coal transporting dump car into delivery vehicles and for reclaiming and loading from storage piles into vehicles and the apparatus for carrying out the process. This application is a division of application Serial No. 17,224, filed March 21, 1925.

While I have shown in the drawings, and shall hereafter refer to the material to be handled as coal, it will be understood that other material, such as burned lime, gravel and beets, may be handled, assorted and screened and loaded with equal facility.

In the drawings in which I have illustrated appropriate mechanisms by which the process may be carried out, Figure 1 is a perspective of a machine by which the screening, assorting and elevating of the material may be accomplished. Figure 2 is a side elevation of the opposite side of the extension chute from that shown in Figure 3, parts cut away. Figure 3 is a diagrammatic longitudinal vertical section of the apparatus showing the chain belt operation and supporting rollers. Figure 4 is an enlarged side elevation of the hinge connection between the main chute and the extension chute. Figure 5 is a side elevation of the same hinge showing the bearing sleeve. Figure 6 is a plan view of one of the stub axles. Figure 7 is an enlarged side elevation of the hinge connection between the main chute and the extension chute. Figure 8 is a side elevation of the same hinge showing the bearing sleeve.

The elevating, sorting, screening and delivery of the material is accomplished by means of a portable conveyor having means connected therewith for screening, assorting and delivering the material as desired.

My apparatus consists of a frame I triangular in side elevation, which is mounted on a channel iron beam N. The base bars 3 of said frame I are supported and mounted on caster rollers R, which are swiveled on the lower ends of externally threaded standards 4, that in turn are engaged with internal threads in the housings 6. Crank rods 7 are connected with the upper ends of said standards 4 to turn the standards and thereby raise and lower the foot portion F of the apparatus. The elevator chute T is supported by a brace member 8 which is parallel with the hypotenuse portion 9 of said frame, and is secured to the vertical portion of said frame I. A guide strip is provided above each of the chains E to prevent the chains and the scraper blades G from raising off the bottom S of the chute T when the extension chute Ta is above the plane of the chute T. The said whels W and the caster rollers R are each spaced from its respective coacting wheel and roller far enough to allow them to rest at all times on the surface of a yard not shown. Guide rollers 27 are mounted on the sides of said foot portion F. A guide strip 19 is secured on the upper side of the foot portion F by means of angle brackets and extends outwardly. Said guide strip 19 also extends on an incline along the upper edge of the chute T and to this portion of said guide strip 19 the aprons 33 are hinged. The guide strips 19 and the aprons 33 form a hopper and said hopper directs the falling and sliding material onto the foot portion F, and prevents it from falling behind the foot portion F. The aprons 33 may be folded one over the other inside the chute T to afford the proper clearance when the apparatus is being moved ahead with the foot portion F in place, and may readily be folded outwardly to form the hopper when the material is falling and sliding onto the foot portion F. The motor M is mounted on the base portion of said frame with its shaft geared to a counter-shaft 10, which is journalled in bearings mounted on the vertical standards 11. A spur gear 12 is secured on the end portion of said counter-shaft 10 which has teeth thereon meshing with the teeth of a gear wheel 13, with its shaft 14 also mounted on said vertical standards 11. A sprocket wheel 15 is also secured on said shaft 14, and is the driving wheel over which the sprocket chain 16 engages.

Another sprocket wheel 17 is secured on one end portion of a horizontal shaft 18 which is journalled through sleeve bearings 46 which are fastened in the circular sheet 45 at the end of the chute T. The shaft 18 extends underneath the bottoms S and Sa and through the sides of said chute T and has another sprocket wheel 40 on the end opposite said sprocket wheel 17. A sprocket chain 41 is engaged by said sprocket wheel 40 and is carried over a sprocket wheel 42, which in turn is secured on a shaft 39 that is mounted in bearings which are secured in the outer end of the extension chute Ta. Sprockets J are also secured on the said shaft 39, which shaft is the main drive shaft of the said chains E. A thin metal sheet S forms the bottom of the said chute T and foot portion F, of the apparatus and is the member which is encircled by the elevator chains E. Spaced apart angle irons are secured at their ends to each of said chains E with the horizontal portions of each bearing against the said sheet S and forming the scraper blades G by which the material is moved upwardly in said chute when the apparatus is in use.

An extension chute Ta is provided by which the material may be raised or lowered to a higher or to a lower level than by the said chute T. The said extension chute Ta is connected with said chute T at the sleeve bearings 46 and the said chains E are operated around the sheet Sa in the same manner and direction as around the sheet S. The outer end portion of said extension chute Ta may be raised and lowered by the cables 20 which are run over sheave pulleys that are mounted on the upper end of the said frame I and the other end of chute Ta is connected by the circular sheets 22 which are journalled on the bearings 46; and by the sheet Sa having a portion thereof bent in a circular groove to engage partially around the said shaft 18, and with the sheet S above the grooved or curved portion of said sheet Sa. This construction allows both sheets to be brought to the same inclined plane or allows the sheet Sa to be brought to a lesser inclined plane than the sheet S or allows the sheet Sa to be inclined downward from the said shaft 18, by the hinged connection between the chute T and the chute Ta. On the upper end of each side of the chute T is secured sheets 43 having a semi-circular segment 44 cut from its interior. Covering the said sheet 43 is another circular sheet 45 which, together with the said sheet 43, is secured on the side of said chute T. The central portion of said sheet 45 is cut out to receive the short sleeve bearings 46 which bearings are secured thereto by counter-sunk bolts. On the adjacent end of the said chute Ta is secured a metal sheet 22 having a circular extension wing conforming with the segment opening 44 of the sheet 43, which extension wing is axially bored or cut away to surround the said sleeve bearings 46 and form a journal therefor. The ends of the sheet 43 are at right angles to the chute T and the upper end is diametrically in line with the center of the bearings 46. The upper portion of the end of the sheet 22 is cut on a radial line 47 extending from the wing extension at right angles to the sides of said sheet, in order that when the extension chute Ta is raised to the same incline plane as the chute T that said radial cut 47 will abut against the end of the sheet 43. The sheet 43 and the sheet 22 are on a vertical plane and the said sheet 45 holds the sheets 43 and 22 in this vertical plane. Bell crank levers 23 are fulcrumed on the outer end of said chute Ta and with the upper arms of said levers connected by cables 24 with the said frame I, while other arms of said levers are connected with a screening and sorting member V by the adjustable connecting rods 30. To achieve the best results it is preferable that the point of attachment of the cable 24 to the frame I be in a plane well above the horizontal plane of the shaft 18. By so arranging the point of pivot for the cable 24, the arm 23 of the bell crank will be maintained at the same inclination. The said screen V is pivoted to the sides of the chute Ta below the discharge end of said chute. The said screening and sorting member V has detachable screens 26 which are carried in a supporting frame Va to carry the coarser material over the screen, while the finer particles will pass between the mesh of said screen and fall against the sheet 25 and by it be directed into one pile or vehicle. Another screen and directing sheet may be provided if more than two grades of material are desired.

Even though the inclination of the chute Ta may be changed from time to time the arrangement of the screening and sorting member of my invention insures that that member will remain at a constant inclination. The movement of the bell crank levers 23, when the position of chute Ta is changed, compensates for the tendency of the screen to assume a different inclination.

Inasmuch as the degree of screening depends upon the rate at which the material passes over the member 26, and inasmuch as this rate is dependent upon the inclination of the screen, my invention insures a uniform screening of the material, even though the chute Ta is raised or lowered. In the absence of such a provision as herein contained, it would be necessary to adjust the screen each time the chute Ta is raised or lowered should a uniform screening be desired.

It will be observed that the rods 30 are provided with a series of apertures, longitudinal of the rods, adapted to receive bolts on the screen member. By placing the bolts in different apertures, variations in the screening may be obtained. The inclination of the screen will thus be altered, resulting in variations in the rate at which the material will traverse the screen.

The operation of the apparatus is as follows:

The motor M is started and the power transmitted to the chains E through the counter-shaft 10, the spur gear 12, the gear wheel 13, the shaft 14, the sprocket wheel 15, the chain 16, the sprocket wheel 17, the shaft 18, the sprocket wheel 40, the chain 41, the sprocket wheel 42, and the shaft 39, which shaft has a small sprocket wheel 38 on each end portion thereof, over and by which the said chains E are operated. As the said chains E are moved up the chute T the scraper blades G slide on the said sheet S and the material is moved off of the foot portion F and up the inclined chute T and over the extension chute Ta, with the material resting on and sliding over the said sheet Sa, as indicated by the arrows a. The said chains E are operated over the end roller H of the foot piece, and sprocket wheels J of the extension chute. As indicated by the arrows a, the said chains pass under the rollers H¹, then over the rollers H², and then around said sprockets J, and over the rollers H³, and then under the rollers H⁴ and around the rollers H. All of the said rollers H to H⁴ inclusive are sprocket idler rollers. The rollers H, H¹, H³ and H⁴ idle on stub shafts and the rollers H² idle on the shaft 18. The rollers H¹ are encased in the housings U to prevent coal from falling onto and injuring said rollers or retarding the operation of said chains.

When desiring to change the inclination of the extension chute Ta, the winches 28 on which the cables 20 are wound are rotated on their axes by the crank handle 37 which raises or lowers the delivery end of said chute. It is evident that the chains E passing over the idler sprockets H² and over the idler sprockets H³ at the hinge joint travel an equal distance at all times as the chute Ta is raised or lowered.

Having thus described the apparatus by which the new features of the invention may be carried out, I desire to secure by Letters Patent and claim:—

1. In combination with a conveyor having an adjustable discharge portion, an apparatus for sorting material comprising a bell crank mounted on the discharge portion, a screening member supported by the bell crank, means to adjust the inclination of the screening member, and means coacting with a fixed portion of the conveyor and the bell crank for operating the screening member.

2. In a conveyor having an end portion adapted to pivot on the main portion of the conveyor, a sorting device, comprising a screening member pivoted on the end portion, a bell crank lever adapted to maintain the screening member at a given angle with respect to the end portion when the latter is fixed on its pivot, and means in conjunction with the bell crank lever to maintain the screening member at a constant inclination to the horizontal when the end portion swings on its pivot.

3. In a conveying apparatus having a discharge portion adapted to be raised and lowered, a sorting device comprising a screen member attached to the conveyor and means to maintain the screen member at the same inclination regardless of the elevation of the discharge portion, said means including a bell crank lever pivoted to the discharge portion of the conveying apparatus, one arm of the bell crank lever being connected to the screen member and the other arm being connected to a fixed portion of the conveying apparatus.

4. In a conveying apparatus having an adjustable portion, a sorting device comprising a frame member rotatably mounted on the adjustable portion, screening means mounted on the frame member, means including a bell crank pivoted to the adjustable portion of the conveyor and connected with a fixed portion of the conveyor for maintaining the frame at a constant inclination regardless of the inclination of the supporting member.

5. A sorting apparatus for a conveyor having a fixed portion and an adjustable discharge portion, comprising a screening member attached to the discharge portion of the conveyor, means for adjusting the inclination of the screening member, and means for maintaining constant the desired inclination of the screening member irrespective of the inclination of the discharge end of the conveyor, said last mentioned means including a bell crank pivoted to the discharge portion of the conveyor, a link connecting one arm of the bell crank with the screening member, and a connection between the other arm of the bell crank and a fixed portion of the conveyor.

6. In combination with a conveyor having a supporting frame, and an adjustable discharge portion, a screening member having one end pivoted to said adjustable portion, a bell crank carried by said adjustable portion, a link carried by one arm of the bell crank and adjustably connected with the screening member, and means for connecting the other arm of the bell crank with the supporting frame of the conveyor.

In testimony whereof I have affixed my signature.

BYRON W. PAPE.